United States Patent
Kraipak et al.

(10) Patent No.: US 12,405,899 B1
(45) Date of Patent: Sep. 2, 2025

(54) INNOVATIVE WAY TO IMPROVE THE TRANSLATION LOOKASIDE BUFFER (TLB) MISS LATENCY

(71) Applicant: Marvell Asia Pte Ltd, Singapore (SG)

(72) Inventors: Waseem Kraipak, Hyderabad (IN); Brian Michael Rogers, Durham, NC (US)

(73) Assignee: Marvell Asia Pte Ltd, Singapore (SG)

( * ) Notice: Subject to any disclaimer, the term of this patent is extended or adjusted under 35 U.S.C. 154(b) by 62 days.

(21) Appl. No.: 18/160,971

(22) Filed: Jan. 27, 2023

Related U.S. Application Data

(60) Provisional application No. 63/433,375, filed on Dec. 16, 2022.

(51) Int. Cl.
*G06F 12/10* (2016.01)
*G06F 12/1027* (2016.01)

(52) U.S. Cl.
CPC .. *G06F 12/1027* (2013.01); *G06F 2212/1024* (2013.01)

(58) Field of Classification Search
CPC ............................................. G06F 12/10–1063
See application file for complete search history.

(56) References Cited

U.S. PATENT DOCUMENTS

| | | | | |
|---|---|---|---|---|
| 7,984,263 | B2* | 7/2011 | Sathaye | G06F 12/10 711/138 |
| 2013/0031332 | A1* | 1/2013 | Bryant | G06F 12/1036 711/206 |
| 2015/0301949 | A1* | 10/2015 | Koka | G06F 12/0815 711/147 |
| 2019/0324918 | A1* | 10/2019 | Zmudzinski | G06F 12/1027 |
| 2021/0406195 | A1* | 12/2021 | Vakharwala | G06F 13/4282 |
| 2022/0382478 | A1* | 12/2022 | Park | G06F 12/1009 |
| 2023/0135599 | A1* | 5/2023 | Monti | G06F 12/1027 711/207 |

* cited by examiner

*Primary Examiner* — Khoa D Doan
(74) *Attorney, Agent, or Firm* — Hamilton, Brook, Smith & Reynolds, P.C.

(57) ABSTRACT

A method of reducing page walk latency resulting from a translation lookaside buffer (TLB) miss comprises providing a page fetch/walk logic module disposed between a coherent fabric and a memory controller. Upon receiving a notification of a TLB miss, performing, by the page fetch/walk logic module, a page table walk of a virtual address to produce a corresponding physical address. The method may further comprise forming, by a memory management unit, a TLB request that comprises a virtual address, and a request type field. The request type field may comprise (i) an indication that a TLB miss has occurred and (ii) a specification of a number of stages required of the page table walk.

20 Claims, 7 Drawing Sheets

INNOVATIVE WAY TO IMPROVE THE TRANSLATION LOOKASIDE BUFFER (TLB) MISS LATENCY

RELATED APPLICATION

This application claims priority under 35 U.S.C. § 119 or 365 to Application No. 63/433,375, filed Dec. 16, 2022. The entire teachings of the above application are incorporated herein by reference.

BACKGROUND

In a processor architecture, for example a processor system on chip (SOC), a processor core writes data to and reads data from an external (to the SOC) memory device such as a dynamic random-access memory (DRAM). FIG. 1 illustrates a high-level view of such an architecture. A processor SOC 10 may comprise one or more processor cores 12 that communicate with one or more memory controllers 14 (such as a double data rate (DDR) controller) through a coherent fabric 16. The DDR controller 14 communicates with a memory device such as a DRAM 18 through physical electrical couplings 20. The DDR controller 14 schedules the data reads and writes requested by the processor core 12.

Processor instruction set architectures typically operate within a virtual memory system, where the addresses used by the instruction set code are translated into physical addresses, which are in turn used by memory systems. The translation from virtual address to physical address is performed by a part of a processor core referred to as a memory management unit (MMU).

A function of the MMU is to enable the processor system to run multiple tasks as independent programs, with each program running in its own private virtual memory space. The tasks work with virtual addresses, and so do not require knowledge of the physical memory map of the system. As illustrated in FIG. 2, an MMU uses translation tables 202, 204 stored in memory to translate virtual addresses 206 to physical addresses 208.

When a processor issues a virtual address (VA) for an instruction fetch or data access from the physical memory (PA), the MMU translates the VA into the PA. The MMU first checks the translation lookaside buffer (TLB), which is a memory cache that stores the recent translations of virtual memory to physical memory. If the TLB does not have a record of the desired VA (i.e., a TLB miss), the MMU performs an iterative "page walk" by extracting a base address and at least one index from the VA. The MMU starts with the base address as a starting point in the physical memory and uses the first index to find a PA that is offset from the base address by the index. If there is only one index in the VA, then the data in that memory location is the PA. If there are other indexes in the VA, then the data in the memory location is the base address for the next index in the VA. This nested procedure continues until the final index in the VA, which will identify the PA. The above-described procedure may be referred to as "page-walk" or "table-walk." Since every step in a page walk requires a physical memory access, and each physical memory access requires a non-trivial amount of time, VA to PA translations that require multiple index page walks may consume a substantial amount of time.

SUMMARY

The embodiments described herein are directed to methods and systems for reducing the amount of time a processor core memory management unit (MMU) takes to translate a virtual address (VA) into a physical address (PA).

In one aspect, the invention may be method of reducing page walk latency resulting from a translation lookaside buffer (TLB) miss. The method may comprise providing a page fetch/walk logic module disposed between a coherent fabric and a memory controller. Upon receiving a notification of a TLB miss, the method may comprise performing, by the page fetch/walk logic module, a page table walk of a virtual address to produce a corresponding physical address.

The method may further comprise forming, by a memory management unit, a TLB request that comprises a virtual address, and a request type field. The request type field may comprise (i) an indication that a TLB miss has occurred and (ii) a specification of a number of stages required of the page table walk. Performing the page table walk of the virtual address to determine the physical address may further comprise receiving a TLB request, and extracting a virtual address field and a request type field from the TLB request.

The request type field may include (i) a TLB miss indication, (ii) a page level miss indication, (iii) a hypervisor stage translation miss level, and (iv) a translation granule size.

The method may further comprise extracting at least one level index from the virtual address and identifying a memory location address by using each of the at least one level index to offset a base address. The method may further comprise using the memory location address as a subsequent base address, and using another of the at least one level index to offset the subsequent base address to identify a physical address. The method may further comprise disposing the fetch/walk logic module on a Compute Express Link communication environment.

In another aspect, the invention may be a system for reducing page walk latency resulting from a translation lookaside buffer (TLB) miss, comprising a processor core having a memory management unit (MMU) and a cache subsystem, a coherent fabric operatively coupled to the processor core, and a page fetch/walk logic module disposed between the coherent fabric and a memory controller. The page fetch/walk logic module may be configured to perform a page table walk of a virtual address to produce a corresponding physical address.

The page fetch/walk logic module is disposed within a Compute Express Link (CXL) communication environment. The CXL communication environment further hosts a memory controller and a memory device. In an embodiment, a communication link between the coherent fabric and the CXL environment is a CXL link. The MMU may further comprise a page walker module configured to perform a page table walk of a virtual address to produce a corresponding physical address. The processor core, the MMU, the cache subsystem, the coherent fabric, the page fetch/walk logic module, and the memory controller all reside on a system on chip (SOC). The processor core, the MMU, the cache subsystem, and the coherent fabric may all reside on a system on chip (SOC) device, and the page fetch/walk logic module, the memory controller, and a memory device may all reside within a Compute Express Link (CXL) communication environment.

In another aspect, the invention may be an apparatus for reducing page walk latency resulting from a translation lookaside buffer (TLB) miss, comprising means for executing a page table walk of a virtual address to produce a corresponding physical address, upon receiving a notification of a TLB miss. The means for executing the page table walk of the virtual address may be disposed between a coherent fabric and a memory controller. The apparatus may further comprise means for forming a TLB request that comprises a virtual address, and a request type field. The apparatus may further comprise means for receiving a TLB request, and means for extracting a virtual address field and a request type field from the TLB request. The apparatus may further comprise means for extracting at least one level index from the virtual address and means for identifying a memory location address by using each of the at least one level index to offset a base address. The apparatus may further comprise means for using the memory location address as a subsequent base address, and means for using another of the at least one level index to offset the subsequent base address to identify a physical address.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Figure 1:
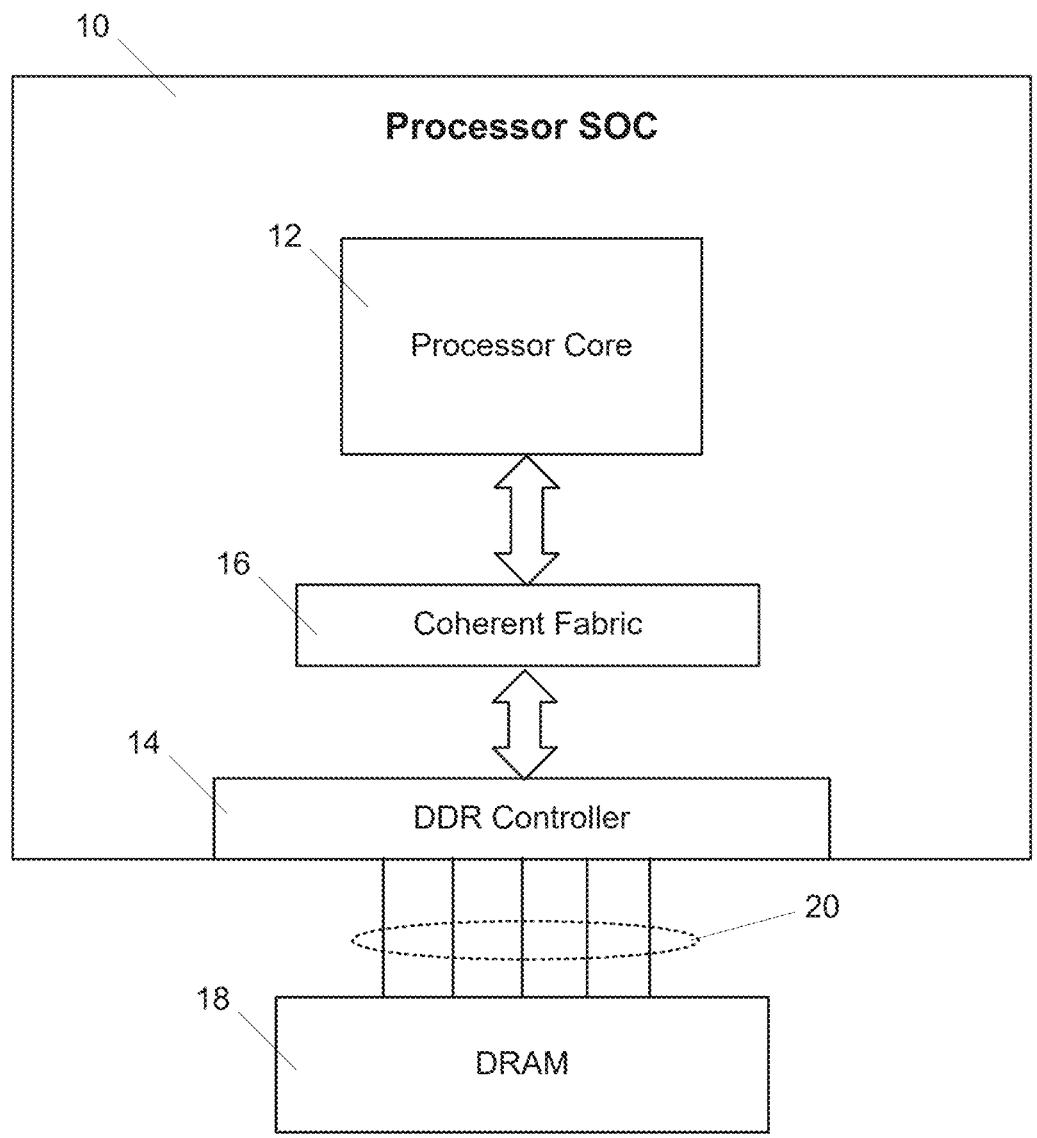
FIG. 1 shows a high-level view of a prior art processor architecture.
Figure 2:
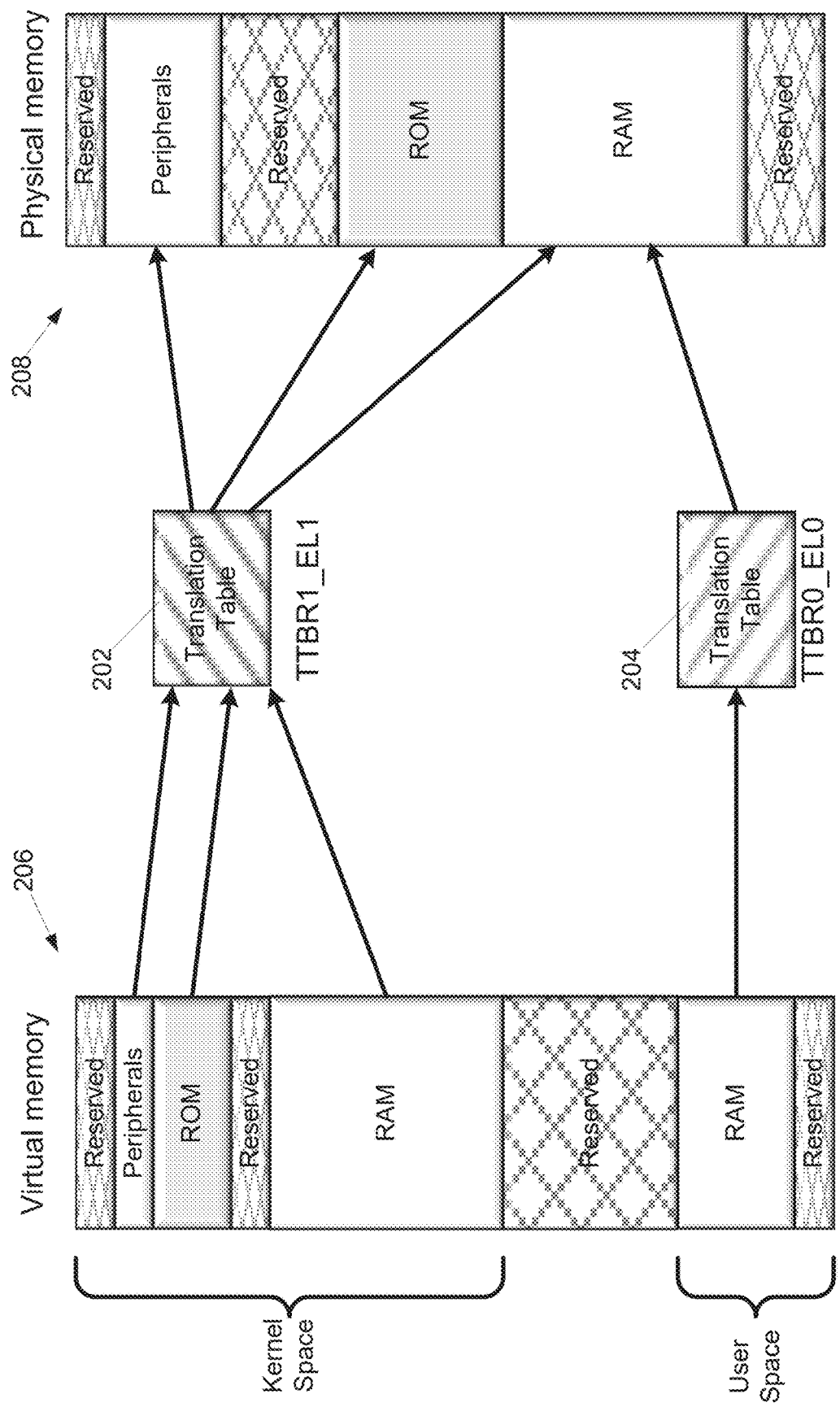
FIG. 2 shows an MMU using translation tables to translate virtual addresses to physical addresses according to the invention.

The embodiments described herein are directed to methods and systems for reducing the amount of time required for a processor core memory management unit (MMU) to determine a physical address (PA) given a virtual address (VA). As illustrated in FIG. 2, an MMU uses translation tables 202, 204 stored in memory to translate virtual addresses 206 to physical addresses 208, in the event of a translation lookaside buffer (TLB) miss. As described herein, VA to PA translations that require multiple index page walks generally consume a substantial amount of time. This is because each step of a page walk procedure requires an access of memory external to the processor device (e.g., processor system on a chip-SOC). When a processor issues a virtual address (VA) for an instruction fetch or data access from the physical memory (PA), the MMU converts the VA to a PA by performing one or more accesses to external memory.

Figure 3A:
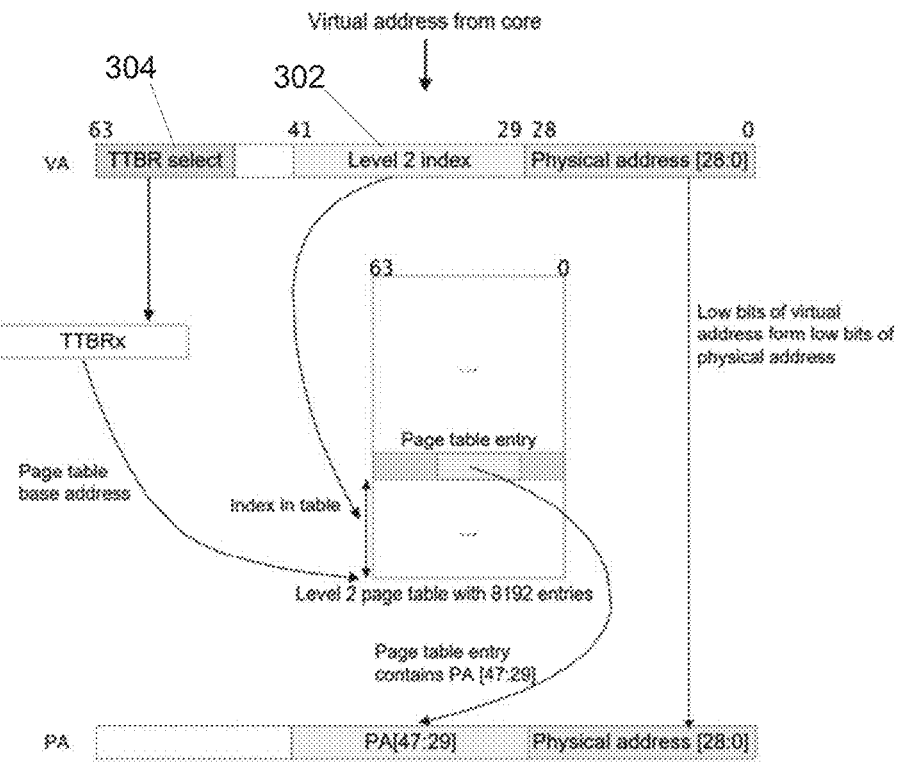
FIG. 3A shows a VA to PA conversion that involves a single index according to the invention.

For example, FIG. 3A shows a VA to PA conversion that involves a single index (level 2 index 302). The TTBR select field 304 of the VA specifies a base address. PA [47:29] is the value stored at the memory location defined by that base address offset by the level 2 index 302. PA [28:0], the lower 29 bits of the PA are the same as the lower 29 bits of the VA.

Figure 3B:
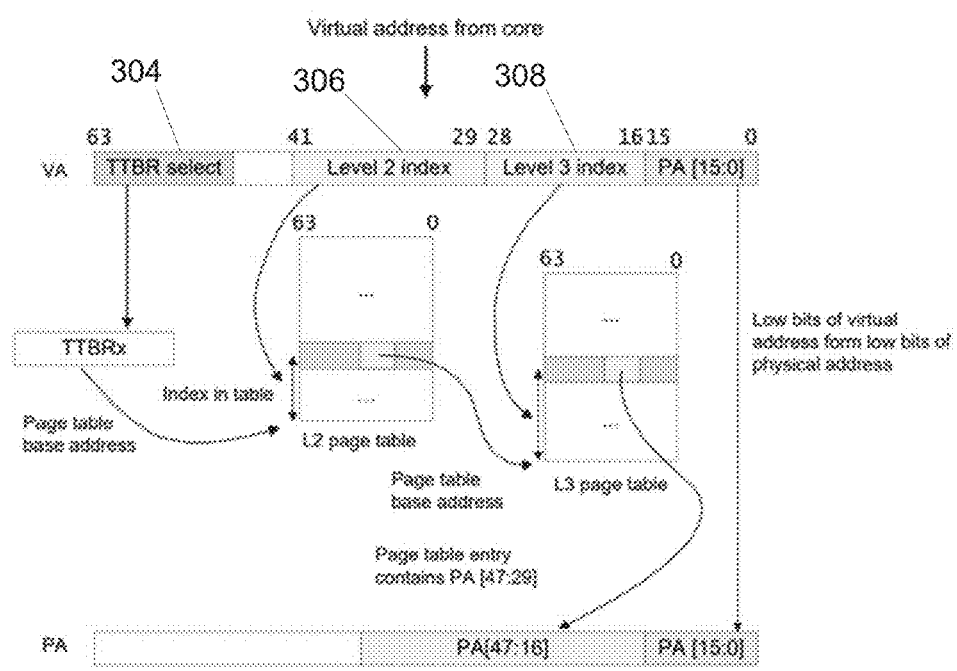
FIG. 3B shows a VA to PA conversion that involves a first index and a second index, according to the invention.

FIG. 3B shows a VA to PA conversion that involves a first index (level 2 index 306) and a second index (level 3 index 308). Again, the TTBR select field 304 defines a base address. The value stored at the memory location defined by that base address offset by the level 2 index 306 is a second base address (rather than the PA as in the example of FIG. 3A). PA [47:16] is the value stored at the memory location defined by the second base address offset by the level 3 index 308. PA [15:0], the lower 16 bits of the PA are the same as the lower 16 bits of the VA.

Figure 3C:
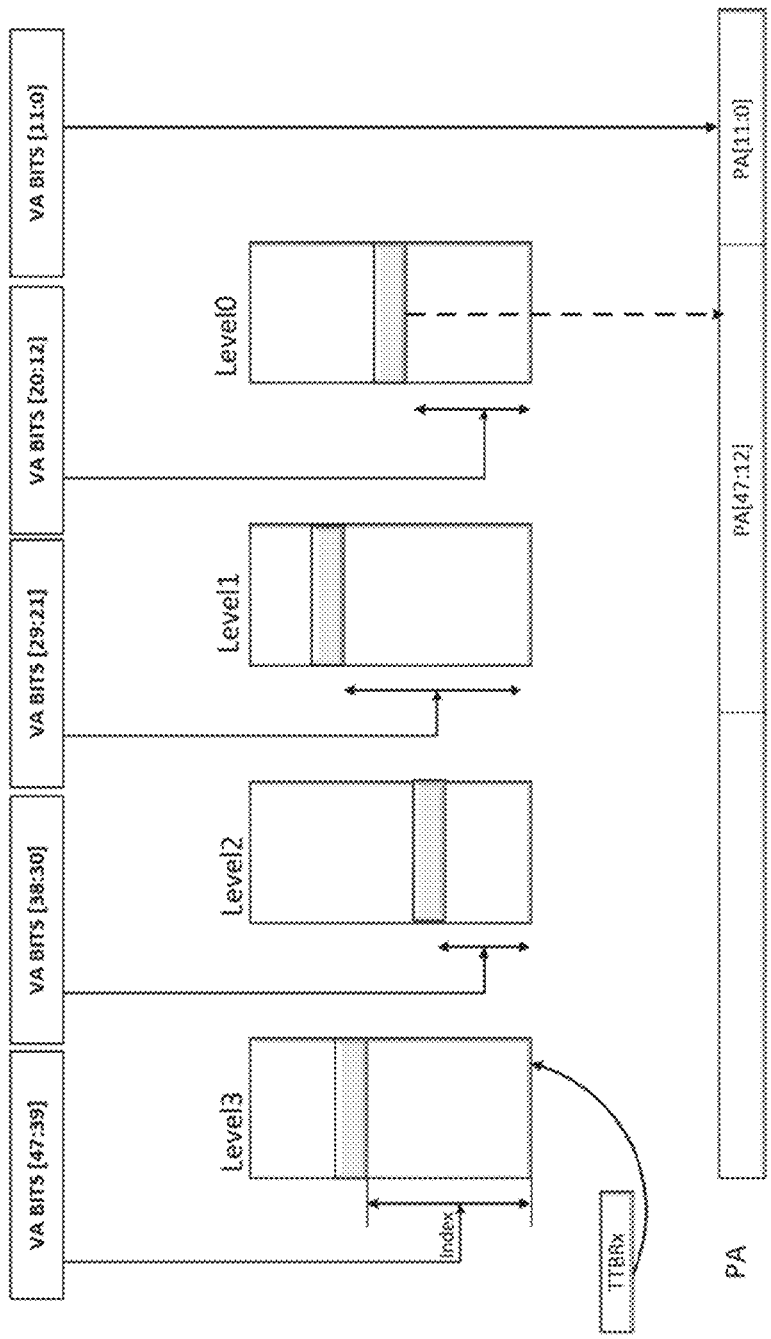
FIG. 3C shows a VA to PA conversion that involves a first index, a second index, and a third index, according to the invention.

The page walking demonstrated in the example embodiments of FIGS. 3A and 3B can be extended beyond the two steps shown in FIG. 3B. Each step in a page walk requires an access of external memory, which requires a substantial amount of time, at least with respect to events within the local processor environment. FIG. 3C illustrates a four-level walk (Level0 through Level3).

Figure 4:
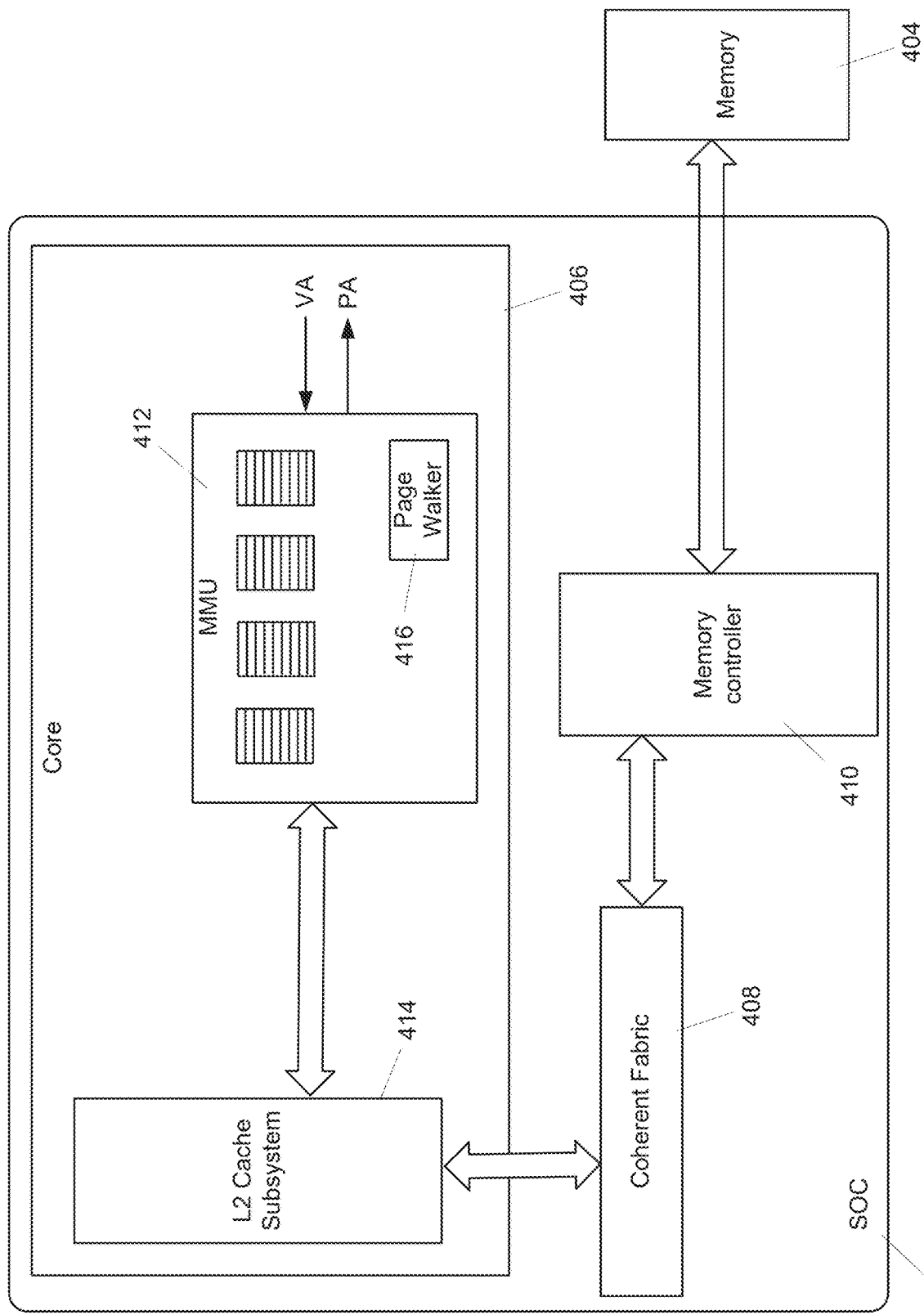
FIG. 4 illustrates an example embodiment of a system on chip (SOC) device coupled to a memory device, according to the invention.

FIG. 4 illustrates an example embodiment of a system on chip (SOC) 402 device coupled to a memory device 404. The memory device 404 may comprise a set of double data rate (DDR) memory components (e.g., dynamic random-access memory-DRAM) arranged, for example, as a dual inline memory module (DIMM).

The SOC 402 may comprise multiple processor cores 406 (only one shown in FIG. 4), coherent fabric 408, and one or more memory controllers 410. The processor core 406 may comprise an MMU 412 and at least one cache subsystem 414. The MMU 412 may comprise a page walker module 416 that conducts the page walking procedure described herein with respect to FIGS. 3A and 3B. The page walker module 416 may comprise hardware components, software components, or both, required to execute the page walking steps described herein.

As mentioned herein, each step in a page walk requires an access of external memory, which takes a substantial amount of time. Each core processor has one or more associated caches, which may facilitate a quick lookup of a VA to PA translation, but a cache miss required at least one external memory access. As shown in FIG. 4, an external memory access requires communication between the MMU 412 and the L2 cache subsystem 414, communication between L2 cache subsystem 414 and coherent fabric 408, communication between coherent fabric 408 and the memory controller 408, and communication between the memory controller 410 and the memory 404. Once the memory access is accomplished, the above-described path steps must be followed in reverse to get the accessed data back to the MMU 412.

In the above-described page walk path, communication between the memory 404 and the memory controller 410 is substantially more time-consuming than any of the other steps. Communication from the MMU 412 to the memory controller 410 is relatively fast (i.e., low latency), compared to the amount of time required for the memory controller to request a read from the memory 404 and for the memory 404 to respond.

When performing a page walk, the MMU 412 must wait for each access of memory 404 as described above, and for the accessed data to be returned to the MMU 412, until continuing on to the next page walk step. This is because, as described herein with respect to FIGS. 3A and 3B, the accessed data is used as a base address for the following page walk step.

Figure 5:
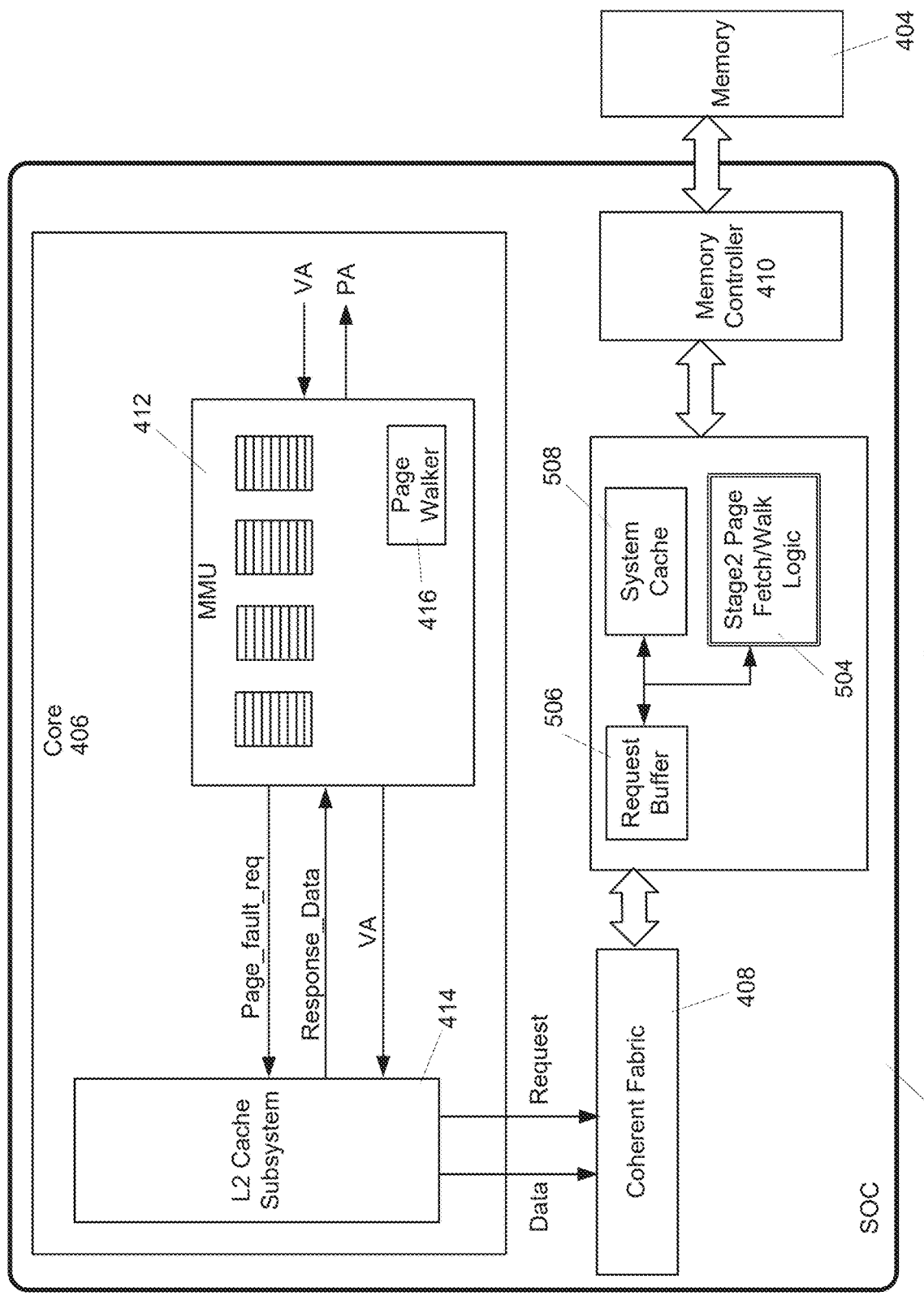
FIG. 5 illustrates an example embodiment of a system architecture that reduces latency of a page walk procedure, according to the invention.

FIG. 5 illustrates an example embodiment of a system architecture that reduces latency of a page walk procedure. This system architecture adds a stage2 page fetch/walk logic module 504 that interfaces with the memory controller 410 and is inserted in the data path between the coherent fabric 408 and the memory controller 410. More specifically, in this embodiment the stage2 page fetch/walk logic module 504 communicates with a request buffer 506 and a system cache 508, both of which may be existing components of the SOC 502. In other embodiments, one or both of the system cache 508 and the request buffer are added to the SOC 502.

To perform a page walk, the MMU 412 communicates with the memory controller 410 through L2 cache 414, and the coherent fabric 408. On the initial communication to execute a page walk (e.g., Page_fault_req in FIG. 5), the stage2 page fetch/walk logic module 504 receives the VA and uses the VA to initiate its own page walk to procure the associated PA. Because the stage2 page fetch/walk logic module 504 is situated downstream of the MMU 412, so close to the memory controller 410, the page walk conducted by the stage2 page fetch/walk logic module 504 may be completed sooner than the same page walk conducted by the MMU 412. In other words, from the standpoint of the stage2 page fetch/walk logic module 504, each step of the page walk eliminates passing through the L2 cache 414 and the coherent fabric 408, i.e., compared to the standpoint of the MMU 412. Eliminating those steps by being situated downstream from the MMU 412 reduces overall per-step latency for the page walk.

Figure 6:
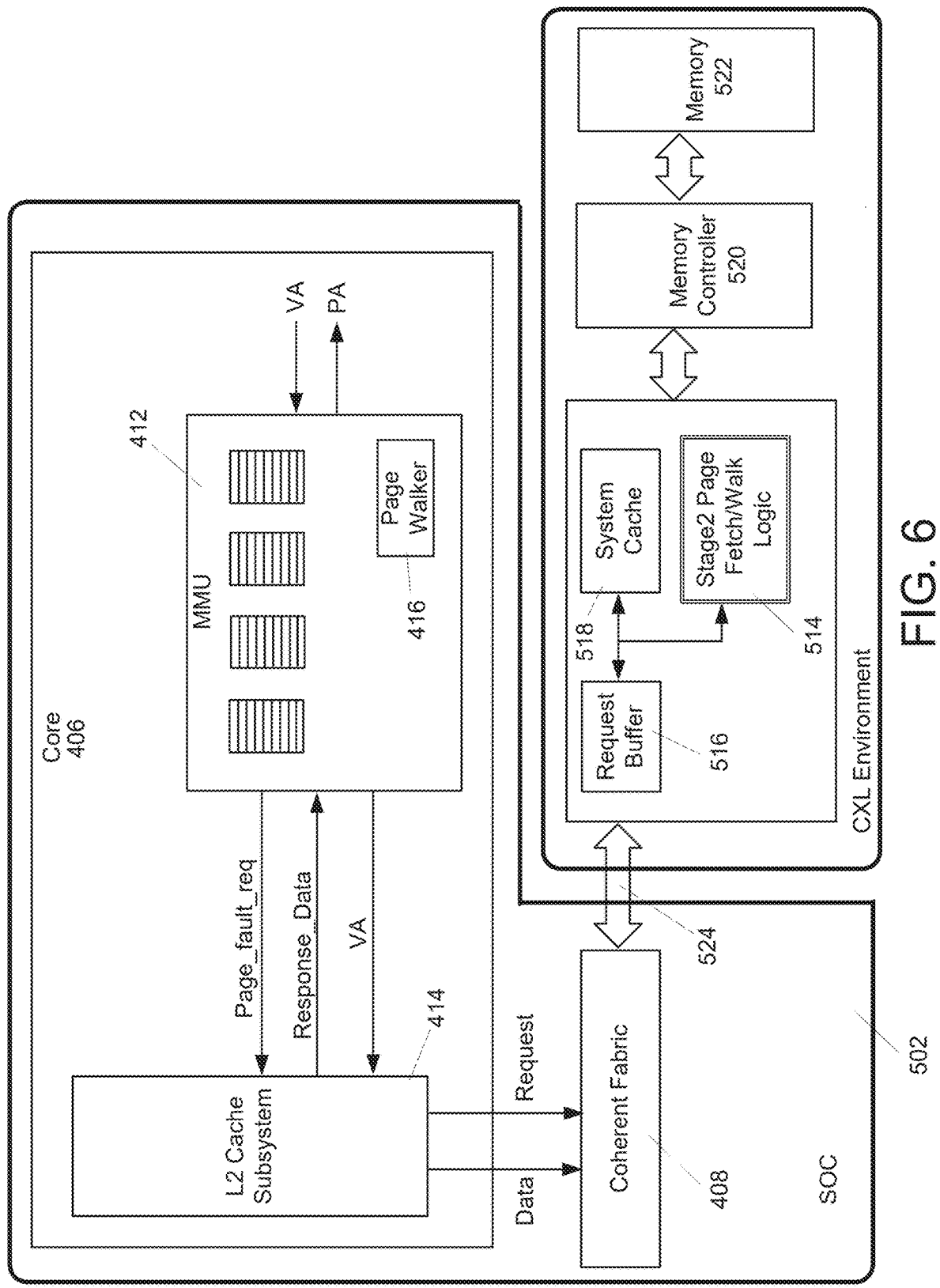
FIG. 6 illustrates another example embodiment of a system architecture that reduces latency of a page walk procedure, according to the invention.

FIG. 6 illustrates another example embodiment of a system architecture that reduces latency of a page walk procedure. This system architecture places the request buffer 516, the system cache 518, the stage2 page fetch/walk logic module 514, the memory controller 520, and the memory 522 are all disposed in a CXL (Compute Express Link) environment, and these CXL environment components communicate with the SOC 502 through a CXL link 524.

In the architectures shown in FIGS. 5 and 6, the existing page walk request from the MMU 412 (page_fault_req) is 40 bits. The described embodiments modify this message field to be 90 bits. The added 50 bits comprise 40 bits for the VA, and 10 bits provide a "request type" field. The request type field is encoded to convey a type of request (Stage1 fault, stage 2 fault, etc.). In a normal, non-fault case, this field may consist of all zeros. In the case of a TLB miss, the field may be encoded to indicate that (i) a TLB miss has occurred, and (ii) the upper 40 bits in the message are the VA. In an example embodiment, the formatting of the page_fault_req (TLB Request) may be as follows.

The TLB Request [47:0] is based on the following conditions:

If the TLB miss happened at Level3 as shown in FIG. 3C
  Translation Base Address [47:10]: VA [47:39].
If the TLB miss happened at Level2 as shown in FIG. 3C
  Descriptor Address [47:10]: VA [38:30]
  VA/IPA [39:0]

Encoding of 10 bit Request Type field:
  Type of Request (one bit) Normal=0 TLB MISS=1
  Page Level Miss (three bits) 000=Level-0, 001-Level1, 010-Level2, etc.
  Hypervisor stage Translation Miss Level (three bits)·
  Translation Granule (TG) (two bits)

When the coherent fabric 408 receives the TLB Request from the processor core 406, the coherent fabric 408 checks the upper 10 bits. If the encoding indicates a TLB miss, the coherent fabric 408 forwards this TLB Request to the request buffer 506, system cache 508, and stage2 page fetch/walk logic module 504. In the case of the CXL embodiment (e.g., FIG. 6), the CXL fabric supports its own system cache.

For the described embodiments, a change to the CXL fabric is to situate the stage2 page fetch/walk logic module 504 next to the system cache 508. When the TLB request is received by the system cache 508, the stage2 page fetch/walk logic module 504 evaluates the upper 10 bits, and then triggers a stage 2 page walk in the system cache 508 if the encoding indicates a TLB miss. The stage2 page fetch/walk logic module 504 fetches the descriptor from the memory and forwards that descriptor to the requesting processor agent. The stage2 page fetch/walk logic module 504 extracts the descriptor and will start fetching the next pages. The remaining pages will be cached inside the system cache 508. When the system cache 508 receives the next request for the next descriptor, the descriptor will be returned by the system cache 508.

As an example, if there are five levels of page walks, there will be 25 memory accesses. For each stage 1 miss there are five memory reads. The described embodiments operate to minimize the remaining four memory reads and keep the four descriptors ready and stored in the system cache 508.

While example embodiments have been particularly shown and described, it will be understood by those skilled in the art that various changes in form and details may be made therein without departing from the scope of the embodiments encompassed by the appended claims.

What is claimed is:

1. A method of reducing page walk latency resulting from a translation lookaside buffer (TLB) miss, comprising:
   providing a page fetch/walk logic module disposed between a coherent fabric and a memory controller, the coherent fabric configured to support a page walk protocol by checking a TLB request message for encoding that indicates the TLB miss, and forwarding the TLB request message when the encoding indicates the TLB miss;
   upon receiving a notification of a TLB miss, performing, by the page fetch/walk logic module, a page table walk of a virtual address to produce a corresponding physical address.

2. The method of claim 1, further comprising forming, by a memory management unit, a TLB request that comprises a virtual address, and a request type field.

3. The method of claim 2, wherein the request type field comprises (i) an indication that a TLB miss has occurred and (ii) a specification of a number of stages required of the page table walk.

4. The method of claim 1, wherein performing the page table walk of the virtual address to determine the physical address further comprises receiving a TLB request, extracting a virtual address field and a request type field from the TLB request.

5. The method of claim 4, wherein the request type field includes (i) a TLB miss indication, (ii) a page level miss indication, (iii) a hypervisor stage translation miss level, and (iv) a translation granule size.

6. The method of claim 3, further comprising extracting at least one level index from the virtual address and identifying a memory location address by using each of the at least one level index to offset a base address.

7. The method of claim 6, further comprising using the memory location address as a subsequent base address, and using another of the at least one level index to offset the subsequent base address to identify a physical address.

8. The method of claim 1, further comprising disposing the fetch/walk logic module on a Compute Express Link communication environment.

9. A system for reducing page walk latency resulting from a translation lookaside buffer (TLB) miss, comprising:
- a processor core having a memory management unit (MMU) and a cache subsystem;
- a coherent fabric operatively coupled to the processor core, the coherent fabric configured to support a page walk protocol by checking a TLB request message for encoding that indicates the TLB miss, and forwarding the TLB request message when the encoding indicates the TLB miss; and
- a page fetch/walk logic module disposed between the coherent fabric and a memory controller, the page fetch/walk logic module configured to perform a page table walk of a virtual address to produce a corresponding physical address.

10. The system of claim 9, wherein the page fetch/walk logic module is disposed within a Compute Express Link (CXL) communication environment.

11. The system of claim 10, wherein the CXL communication environment further hosts a memory controller and a memory device.

12. The system of claim 9, wherein a communication link between the coherent fabric and the CXL environment is a CXL link.

13. The system of claim 9, wherein the MMU further comprises a page walker module configured to perform a page table walk of a virtual address to produce a corresponding physical address.

14. The system of claim 9, wherein the processor core, the MMU, the cache subsystem, the coherent fabric, the page fetch/walk logic module, and the memory controller all reside on a system on chip (SOC).

15. The system of claim 9, wherein the processor core, the MMU, the cache subsystem, and the coherent fabric all reside on a system on chip (SOC), and the page fetch/walk logic module, the memory controller, and a memory device all reside within a Compute Express Link (CXL) communication environment.

16. An apparatus for reducing page walk latency resulting from a translation lookaside buffer (TLB) miss, comprising:
- means for executing a page table walk of a virtual address to produce a corresponding physical address, upon receiving a notification of a TLB miss by checking a TLB request message for encoding that indicates the TLB miss, and forwarding the TLB request message when the encoding indicates the TLB miss;
- the means for executing the page table walk of the virtual address disposed between a coherent fabric and a memory controller, the coherent fabric configured to support a page walk protocol.

17. The apparatus of claim 16, further comprising means for forming a TLB request that comprises a virtual address, and a request type field.

18. The apparatus of claim 16, further comprising means for receiving a TLB request, and means for extracting a virtual address field and a request type field from the TLB request.

19. The apparatus of claim 16, further comprising means for extracting at least one level index from the virtual address and means for identifying a memory location address by using each of the at least one level index to offset a base address.

20. The apparatus of claim 19, further comprising means for using the memory location address as a subsequent base address, and means for using another of the at least one level index to offset the subsequent base address to identify a physical address.

\* \* \* \* \*